(12) United States Patent
Fukuhisa et al.

(10) Patent No.: US 7,197,593 B2
(45) Date of Patent: Mar. 27, 2007

(54) BAD-SECTOR SEARCH METHOD, DATA RECORDING DEVICE, AND PROGRAM

(75) Inventors: Ryoji Fukuhisa, Tokyo (JP); Nobuya Matsubara, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 431 days.

(21) Appl. No.: 10/717,697

(22) Filed: Nov. 20, 2003

(65) Prior Publication Data

US 2004/0153745 A1 Aug. 5, 2004

(30) Foreign Application Priority Data

Nov. 20, 2002 (JP) ............................. 2002-336280

(51) Int. Cl.
*G11C 29/04* (2006.01)
(52) U.S. Cl. ..................... 711/4; 714/723; 714/25; 714/42; 714/40; 714/1; 714/718
(58) Field of Classification Search .................. 714/42, 714/40, 25, 723, 718; 711/4
See application file for complete search history.

(56) References Cited

U.S. PATENT DOCUMENTS

| | | | | | |
|---|---|---|---|---|---|
| 4,597,020 | A | * | 6/1986 | Wilkinson | 386/124 |
| 4,821,254 | A | * | 4/1989 | Satoh et al. | 369/53.36 |
| 4,972,316 | A | * | 11/1990 | Dixon et al. | 711/113 |
| 5,146,571 | A | * | 9/1992 | Logan | 714/8 |
| 5,632,012 | A | * | 5/1997 | Belsan et al. | 714/6 |
| 5,751,947 | A | * | 5/1998 | Arakawa | 714/54 |
| 5,935,261 | A | * | 8/1999 | Blachek et al. | 714/42 |
| 6,178,549 | B1 | * | 1/2001 | Lin et al. | 717/124 |
| 6,281,676 | B1 | * | 8/2001 | Ottesen et al. | 324/212 |
| 6,496,943 | B1 | * | 12/2002 | Belser et al. | 714/8 |
| 6,564,345 | B1 | * | 5/2003 | Kim et al. | 714/723 |
| 6,654,904 | B1 | * | 11/2003 | Andoh et al. | 714/8 |
| 6,691,265 | B2 | * | 2/2004 | Kim et al. | 714/723 |
| 6,701,465 | B1 | * | 3/2004 | Tashiro | 714/54 |
| 6,728,899 | B1 | * | 4/2004 | Ng et al. | 714/8 |
| 6,925,580 | B2 | * | 8/2005 | Hoskins | 714/8 |

FOREIGN PATENT DOCUMENTS

JP  2000-156051  6/2000

OTHER PUBLICATIONS

Bovet et al., "Understanding the Linux Kernel", Oct. 2000, O'Reilly & Associates, Inc., Chapter 10.*
Stockman, "Connected Compenets or COLORING program", 1997, Internet, http://www.cse.msu.edu/~stockman/HS97/coloring.cc.*

* cited by examiner

*Primary Examiner*—Sanjiv Shah
*Assistant Examiner*—Samuel Dillon
(74) *Attorney, Agent, or Firm*—Bracewell & Giuliani LLP

(57) ABSTRACT

While executing a command that accesses a sector on a disk-shaped recording medium placed in a data recording device, an address of a sector where it is difficult to read data is recorded in a memory. After that, a determination is made as to whether or not the data recording device is executing a command. If it is judged that the data recording device is not executing a command, the address of the sector is read from the memory, and then a bad sector is searched for by detecting whether or not it is difficult to read data from each of surrounding sectors adjacent to the sector, the address of which has been read.

5 Claims, 4 Drawing Sheets

BAD-SECTOR SEARCH METHOD, DATA RECORDING DEVICE, AND PROGRAM

RELATED PATENT APPLICATION

This application claims priority to Japanese Patent Application No. JP2002-336280, (Hitachi Global Storage Technologies Docket No. JP920020182US1), filed on Nov. 20, 2002, and entitled "Bad-Sector Search Method, Data Recording Device, and Program."

BACKGROUND OF THE INVENTION

1. Technical Field

The present invention relates to a data recording device such as a hard disk drive unit, and more particularly to a search method for searching for a sector where it is difficult to read and write data, said sector existing on a data track of a disk-shaped recording medium.

2. Description of the Related Art

Various portable storage mediums have been proposed for storing data in various devices including personal computers (PCs) and digital cameras. Efforts have been made to miniaturize those storage mediums and to increase the capacity of those storage mediums. For example, a new assembly structure of a portable hard disk drive (HDD) conforming to Compact Flash® (SanDisk Corporation), i.e., one of standards for small memory cards, has been proposed.

There has commercially been produced a portable, large-capacity subminiature hard disk drive. This hard disk drive uses a one-inch 1 GB disk and has a weight of only about 16 g. This portable, subminiature hard disk drive is provided, in addition to a magnetic disk (disk) for data storage, a spindle motor for driving the disk for rotation, a read/write head for reading and writing data from and to the disk, and an actuator for moving the read/write head across the disk.

The functional unit including the disk, the spindle motor, the read/write head and the actuator of this subminiature hard disk drive are formed very precisely for miniaturization. Therefore, if the hard disk drive is dropped or is struck against something, it is possible that the subminiature hard disk drive malfunctions. To solve such a problem, the applicant of the present patent application previously proposed a technique for effectively absorbing external shocks by shock absorbing members disposed in the corners of a disk drive. That technique devises a guide groove for use in mounting the hard disk drive on another device to conform to the Compact Flash standards.

SUMMARY OF THE INVENTION

The prior art has a technical problem in that, if a bad sector generated during the use after product shipment is caused by a flaw on a surface of a hard disk in a hard disk drive, even if the bad sector is reassigned, there is an extremely high possibility that the bad sector continuously extends along the flaw, and consequently data across a plurality of sectors is lost in a certain area.

In this connection, the prior art includes a method in which an error which is recovered by an offset read is judged to require an adjacent defect entry, and an adjacent defect entry is made in a reverse direction of a recovered offset direction. However, the prior art does not disclose an effective technology for searching for a real range of extending bad sectors.

The present invention has been made taking such technical problems into consideration, and an object of the present invention is to prevent a loss of data from occurring by searching for an unusable bad sector beforehand. Another object of the present invention is to provide a data recording device capable of preventing a loss of data before it happens by searching for an unusable bad sector beforehand.

According to one aspect of the present invention, there is provided a bad-sector search method, said bad-sector search method comprising: a recording step whereby while executing a command that accesses a sector on a disk-shaped recording medium placed in a data recording device, an address of a sector where data reading is difficult is recorded in a memory; a determining step for determining whether or not the data recording device is executing a command; and a detecting step whereby if it is determined that the data recording device is not executing a command, the address of the sector is read from the memory to detect whether or not it is difficult to read data from each of surrounding sectors adjacent to the sector, the address of which has been read.

Here, said bad-sector search method is characterized in that if the number of steps of error recovery procedures executed for data recorded in a sector exceeds a predetermined specified value, or if the data cannot be read out, the detecting step detects that data reading on the sector is difficult. In addition, said bad-sector search method is characterized in that if a new command is not received within a given period of time after the data recording device completed the execution of the last command, the determining step determines that a command is not being executed. Moreover, said bad-sector search method further comprises an interruption step for immediately interrupting the detecting step when the data recording device receives a command.

According to another aspect of the present invention, there is provided a bad-sector search method, said bad-sector search method comprising: a bad sector recording step whereby while executing a command that accesses a sector on a disk-shaped recording medium placed in a data recording device, a bad sector is detected, and then an address of the bad sector is recorded in a memory; a determining step for determining whether or not the data recording device is executing a command; a detecting step whereby if it is determined that the data recording device is not executing a command, addresses of surrounding sectors adjacent to the bad sector, the address of which is recorded in the memory, are recorded in the memory, and then whether or not each of the surrounding sectors is a bad sector is detected; and a bad-surrounding-sector recording step whereby if the surrounding sector is not a bad sector, the address of the surrounding sector is deleted from the memory, and if the surrounding sector is a bad sector, the address of the surrounding sector is recorded in the memory as a bad sector.

Here, said bad-sector search method is characterized in that if the number of steps of error recovery procedures executed for data recorded in the surrounding sector exceeds a predetermined specified value, or if the data cannot be read out, the detecting step detects that the surrounding sector is a bad sector. In addition, said bad-sector search method is characterized in that the search step further comprises processing that deletes an address of a sector, a search for which has already been completed, from addresses of surrounding sectors in the memory. In addition, said bad-sector search method is characterized in that the search step further comprises processing whereby focusing on two bad sectors adjacent to each other, each address of surrounding sectors adjacent to one bad sector is mutually compared with each address of surrounding sectors adjacent to the other bad sector, and one of duplicated surrounding sectors is deleted from the memory. Moreover, said bad-sector search method further comprises an interruption step for immediately interrupting the detecting step when the data recording device receives a command. Furthermore, said bad-sector search method further comprises a step for recording history information about an interrupted search for a bad sector in the memory, and thereby executes the detecting step according to the history information recorded in the memory.

According to another aspect of the present invention, there is provided a data recording device, said data recording device comprising: recording means whereby while executing a command that accesses a sector on a disk-shaped recording medium, an address of a sector where data reading is difficult is recorded in a memory; determining means for determining whether or not a command is being executed; and detecting means whereby if it is determined that the command is not being executed, the address of the sector is read from the memory to detect whether or not it is difficult to read data from each of surrounding sectors adjacent to the sector, the address of which has been read.

Here, said data recording device is characterized in that if the number of steps of error recovery procedures executed for data recorded in a sector exceeds a predetermined specified value, or if the data cannot be read out, the detecting means detects that data reading on the sector is difficult. In addition, said data recording device is characterized in that if a new command is not received within a given period of time after the execution of the last command is completed, the determining means determines that a command is not being executed. Moreover, said data recording device further comprises an interruption means whereby on receipt of a command, operation of the detecting means is immediately interrupted.

Moreover, according to another aspect of the present invention, there is provided a data recording device, said data recording device comprising: bad sector recording means whereby while executing a command that accesses a sector on a disk-shaped recording medium, a bad sector is detected, and then an address of the bad sector is recorded in a memory; command determining means for determining whether or not a command is being executed; surrounding sector recording means whereby addresses of surrounding sectors adjacent to the bad sector, the address of which is recorded in the memory, is recorded in the memory; bad-surrounding-sector detecting means for detecting whether or not each of the surrounding sectors is a bad sector; and bad-surrounding-sector recording means whereby if the surrounding sector is not a bad sector, the address of the surrounding sector is deleted from the memory, and if the surrounding sector is a bad sector, the address of the surrounding sector is recorded in the memory as a bad sector.

In addition, said data recording device further comprises a means for deleting an address of a sector, a search for which has already been completed, from the addresses of the surrounding sectors recorded in the memory by the surrounding sector recording means. Moreover, said data recording device further comprises means whereby focusing on the two bad sectors adjacent to each other, each address of surrounding sectors adjacent to one bad sector is mutually compared with each address of surrounding sectors adjacent to the other bad sector, and one of duplicated surrounding sectors is deleted from the memory.

Further, according to another aspect of the present invention, there is provided a program, said program permitting a computer to realize functions of: while executing a command that accesses a sector on a disk-shaped recording medium placed in a data recording device, recording in a memory an address of a sector where data reading is difficult; determining whether or not the data recording device is executing a command; and if it is determined that the data recording device is not executing a command, reading the address of the sector from the memory to detect whether or not it is difficult to read data from each of surrounding sectors adjacent to the sector, the address of which has been read.

Furthermore, according to another aspect of the present invention, there is provided a program, said program permitting a computer to realize functions of: while executing a command that accesses a sector on a disk-shaped recording medium placed in a data recording device, detecting a bad sector, and then recording an address of the bad sector in a memory; determining whether or not the data recording device is executing a command; and recording, in the memory, addresses of surrounding sectors adjacent to the bad sector, the address of which is recorded in the memory; detecting whether or not each of the surrounding sectors is a bad sector; and if the surrounding sector is not a bad sector, deleting the address of the surrounding sector from the memory, and if the surrounding sector is a bad sector, recording the address of the surrounding sector in the memory as a bad sector.

It is to be noted that said program may be executed by, for example, loading the program stored in a reserved area of a disk into a RAM. In addition, there is a mode in which said program is executed by a MPU in a state in which the program is stored in a ROM beforehand. Moreover, there is also a case where if a rewritable ROM such as an EEPROM is included, only the program is provided and installed in the ROM after equipment is assembled. As for how to provide this program, the following mode can also be considered: a program is transmitted via a network such as Internet to a computer comprising a data recording device where the program is installed in a ROM included in the data recording device.

DETAILED DESCRIPTION OF THE INVENTION

Figure 1:
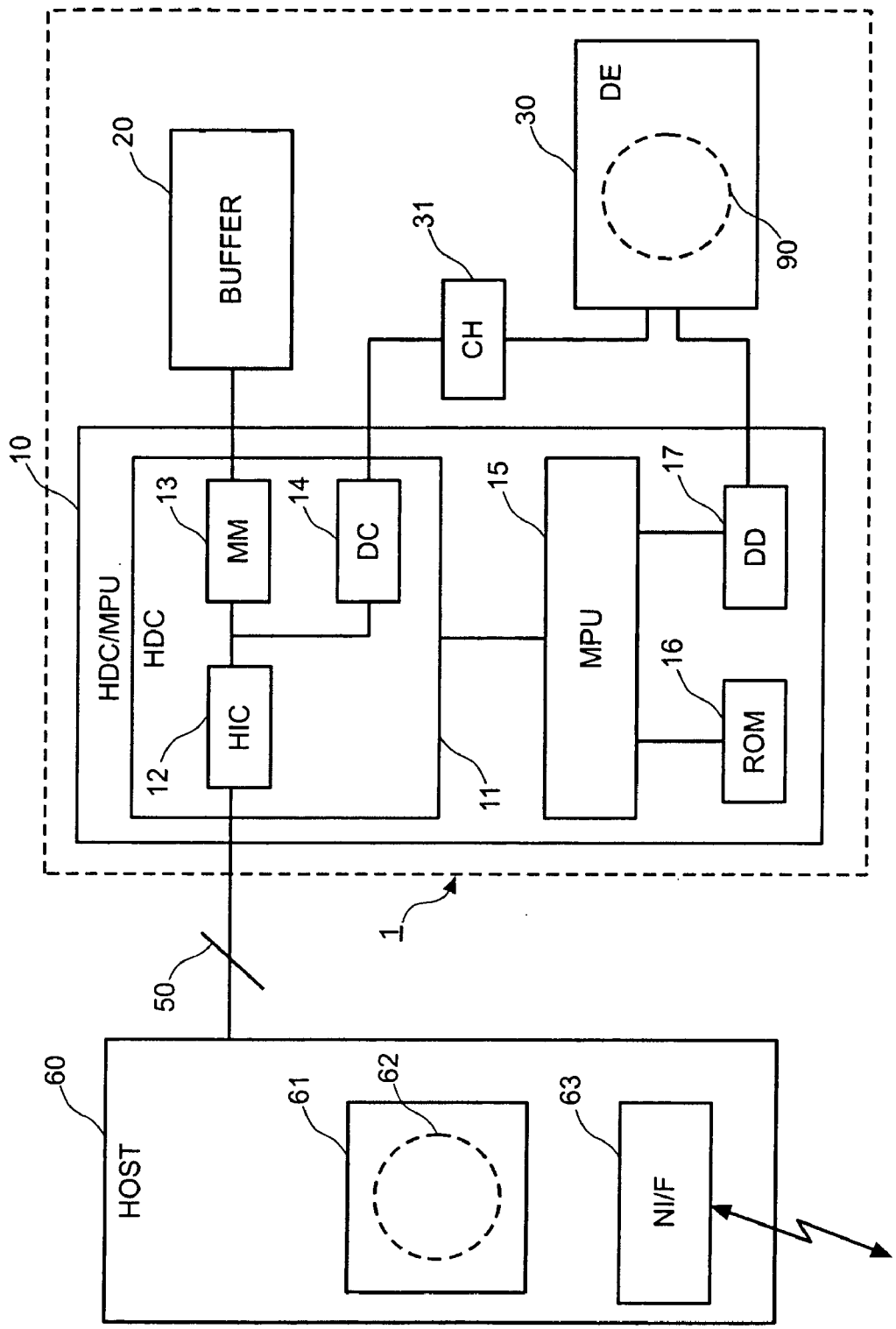
FIG. 1 is a block diagram illustrating a hard disk drive unit according to this embodiment.

The present invention will be described in detail according to embodiments shown in attached drawings as below. FIG. 1 is a block diagram illustrating a hard disk drive according to this embodiment. In FIG. 1, the hard disk drive (HDD) 1 comprises a HDC/MPU 10 having a hard disk controller (HDC) 11 and a MPU (Micro Processing Unit) 15; a buffer (BUFFER) 20; and a disk enclosure (DE) 30. The HDC/MPU 10 is connected to a host (HOST) 60 via an interface (I/F) 50. The HOST 60 comprises a removable disk drive 61 that reads data recorded on an non-rewritable removable disk 62 such as a CD-ROM and a DVD-ROM (DVD Read Only Memory), and that can record data on a rewritable removable disk 62 such as a CD-RW (CD Rewritable) and a DVD-RAM (DVD Read Access Memory); and a network interface (NI/F) 63 for communicating with outside networks and downloading various kinds of programs. It is to be noted that the removable disk 62 may also be, for example, a magneto-optical disk, such as a MO disk (Magneto Optical Disk), other than optical disks.

In the HDC/MPU 10, the HDC 11 comprises a host interface controller (HIC) 12, a memory manager (MM) 13, and a data controller (DC) 14. The HDC 11 and the MPU 15 are connected. A ROM 16 and a device driver (DD) 17 are connected to the MPU 15. The DC 14 is connected to a channel (CH) 31 that converts data to be read from, and written to, a hard disk 90 in the DE 30. On the other hand, the DD 17 includes a spindle driver that performs rotation control of a spindle (not illustrated) of the hard disk 90 provided in the DE 30; and a VCM driver for driving a voice coil motor (VCM: not illustrated) provided in a magnetic head (not illustrated) that reads and writes data on the hard disk 90.

When writing data to this HDD 1, the data transferred from the host 60 through the I/F 50 is passed through the HIC 12 and the MM 13, and is then temporarily stored in the buffer 20. After that, the data stored in the buffer 20 is written to the hard disk 90 through the MM 13 and the DC 14 according to an instruction of the MPU 15. On the other hand, when reading data stored in the hard disk 90, the data is passed through the DC 14 and the MM 13, and is then temporarily stored in the buffer 20 according to an instruction of the MPU 15. After that, the data is output to the HOST 60 through the MM13 and the HIC 12.

The MPU 15 interprets and executes firmware stored in the ROM 16 and the buffer 20, which is the way to write and read the data. In this connection, the firmware stored in the buffer 20 is recorded on the hard disk 90. It is so devised that the firmware is read out into the buffer 20 at boot up. This firmware can be rewritten from the HOST 60. As a method of how the HOST 60 can obtain the firmware, there is a method in which the removable disk 62 is read by the removable disk drive 61, or there is a method whereby the firmware is downloaded from outside through the NI/F 63.

Next, a search for a bad sector in the hard disk 90, which is executed in this embodiment, will be described. Hereinafter the "sector" means both a data sector and a servo sector.

To begin with, when receiving a data read command from the HOST60, the HDD 1 starts reading of data written on the hard disk 90. If the number of steps of ERP (Error Recovery Procedures), which are executed during the reading of the data, exceeds a predetermined specified value, or if even the execution of the ERP could not recover data of a sector, it is judged that an error occurred in the sector.

As a result, the HDD 1 treats the sector in which the error occurred as a bad sector, and then records a LBA (Logical Block Address) of the bad sector in the buffer 20. Here, the LBA is a serial number assigned to each sector in the hard disk 90. In addition, history information about a search for a bad sector, which will be described below, is also recorded in the buffer 20 as information about the bad sector. To be more specific, for each bad sector, the LBA of which has been recorded in the buffer 20, search history information is recorded at the same time. The search history information shows one of the following states: a state in which a search has already been completed ("search completed"); a state in which although a search is started, the search is interrupted because a command is received from the HOST 60, and consequently restart of the search is waited ("search interrupted/restart waited"); or a state in which a search is not yet started ("search not started"). It is to be noted that although the LBA of the bad sector and the search history information about the bad sector were recorded in the buffer 20 in this embodiment, they may also be recorded in a RAM if the RAM is connected to the MPU 15.

Next, after the last command from the HOST 60 such as data writing to the hard disk 90 and data reading from the hard disk 90 is executed, the HDD 1 determines whether or not a new command is received within a given period of time. To be more specific, at the time when the HDD 1 finished processing of the last command from the HOST 60, the HDD 1 starts a stopwatch in the MPU 15. After that, if a new command is not received from the HOST 60 within a given period of time, for example, before 10 seconds pass, the HDD 1 determines that the HDD 1 is in "a state in which a command from the HOST 60 is not being executed".

As soon as it is determined that the HDD 1 is in "a state in which a command is not being executed", the HDD 1 starts search processing to detect whether or not each of surrounding sectors adjacent to the bad sector, the LBA of which is recorded in the buffer 20, is normal. Here, the "surrounding sectors" mean areas physically adjacent to the bad sector.

Figure 2:
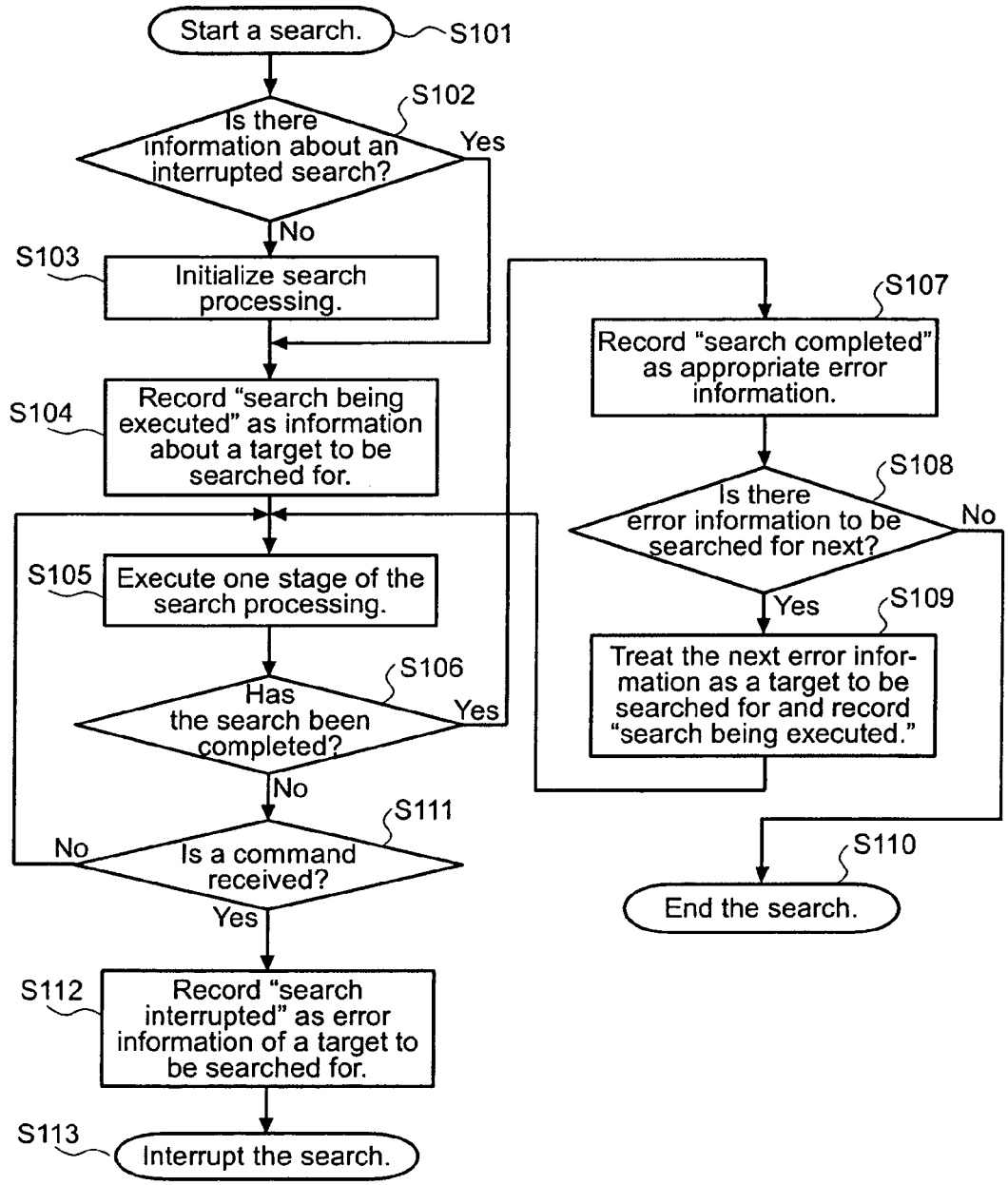
FIG. 2 is a flowchart illustrating the algorithm that searches for surrounding sectors adjacent to a bad sector.

Here, algorithm that searches for surrounding sectors adjacent to a bad sector, which is executed in the MPU 15, will be described. FIG. 2 is a flowchart illustrating the algorithm that searches for surrounding sectors around a bad sector.

To begin with, a search for a bad sector is started (step S101). More specifically, from among bad sectors, LBAs of which are recorded in the buffer 20, a bad sector having the earliest recorded search history information of "search interrupted/restart waited" or "search not started" is selected, and then a search for the bad sector is started. This is because in the buffer 20, an area where information about bad sectors is recorded is configured as a ring buffer. Accordingly, if there is no more free area in the area where the information is recorded, recorded information is deleted in the order the information is recorded, and then new information is overwritten at a location where the recorded information is deleted.

Next, a judgment is made as to which information is recorded as search history information about the bad sector to be searched for, "search interrupted/restart waited" or "search not started" (step S102). If "search not started" is recorded as the search history information about the bad sector, data about the search for the bad sector is initialized (step S103).

In this connection, when the HDD 1 searches for a bad sector for the first time after product shipment, search history information about a bad sector recorded in the buffer 20 is always "search not started". Therefore, as for a bad sector that is first searched for, data about the search for the bad sector is initialized.

Next, "search being executed" is recorded as the search history information corresponding to the selected bad sector to be searched for (step 104) before executing processing of the search for the bad sector (step S105). Subsequently, as soon as the search is completed (step S106), "search completed" is recorded (step S107), and then checks whether or not there is a bad sector that should be searched for next (step S108). If there is a bad sector to be searched for, the bad sector is selected, and then "search being executed" is recorded (step S109). After that, search processing is executed in like manner (step S105). On the other hand, if there is no bad sector to be searched for, the search ends (step S110).

In addition, when a command comes from the HOST 60 while executing the search processing (step S111), "search interrupted/restart waited" is recorded as the search history information corresponding to the bad sector that is being searched for (step S112), and then the search is interrupted (step S113). In this case, information about a stage to which the search for the bad sector progresses is recorded as data about the search for the bad sector. For example, LBAs of surrounding sectors adjacent to the interrupted bad sector, which have already been searched for, are recorded.

Because it is necessary to perform this search processing without hindering a command coming from the HOST 60 from being executed, a judgment is frequently made as to whether or not a command comes during the execution of the search processing. As soon as a command comes, the search processing is interrupted immediately.

Next, processing of a search for a bad sector as a first embodiment will be described. Here, in order to simplify description, a case where the same number of sectors are arranged on each track will be described. Thus, a case where there are eight surrounding sectors around one sector will be described.

Figure 3:
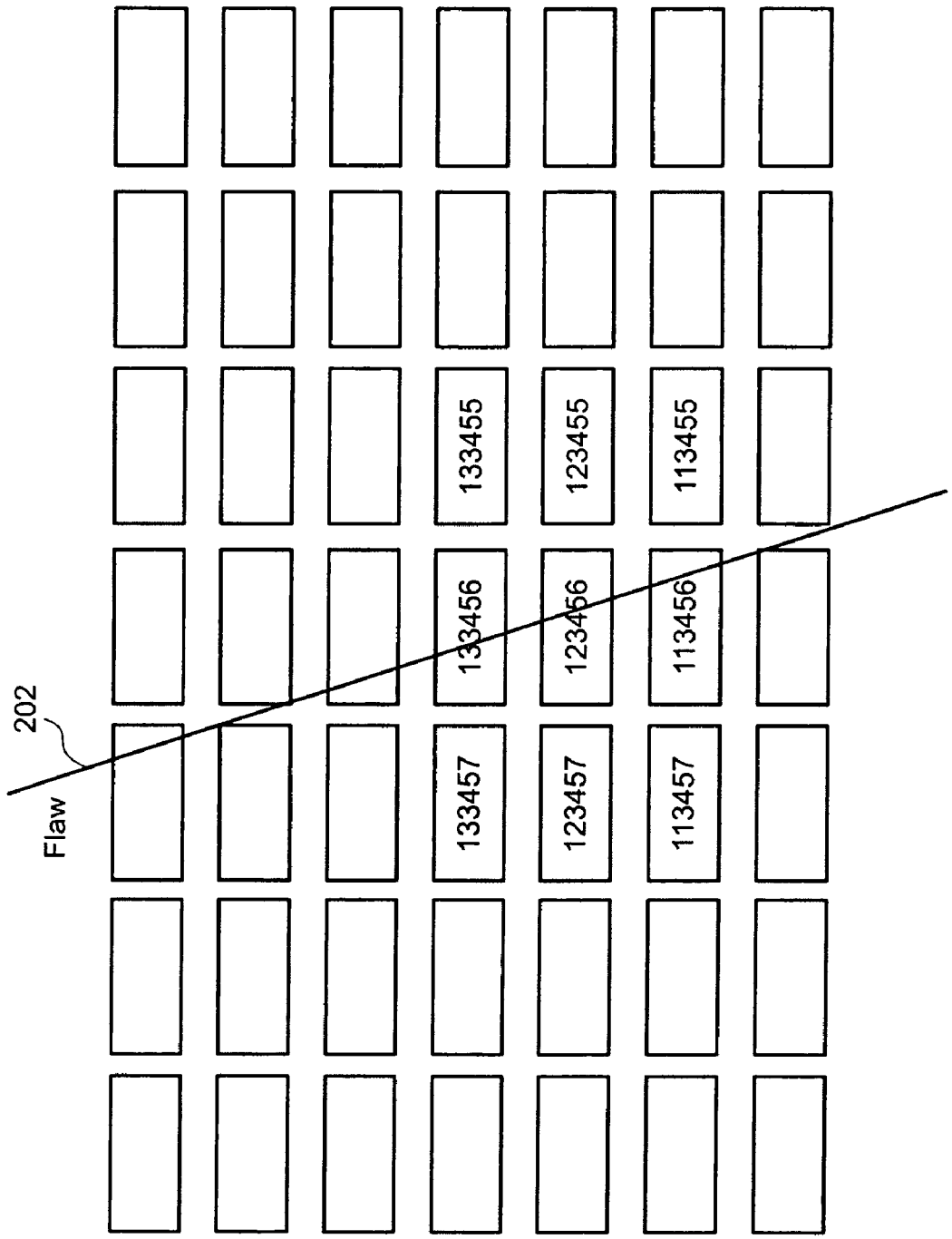
FIG. 3 is a diagram schematically illustrating a state in which recorded sectors are arranged on a hard disk.

FIG. 3 is a diagram schematically illustrating a state in which recorded sectors are arranged on the hard disk 90. In FIG. 3, one rectangle corresponds to one sector, and a straight line 202 indicates a flaw on the hard disk 90.

In FIG. 3, if a bad sector, a LBA of which is recorded on the buffer 20, is treated as a center of a search, surrounding sectors adjacent to the bad sector become the first target to be searched. To begin with, as a search step 1, an area for search processing is assigned to the buffer 20. Then, a bad sector as a center of the search, and LBAs of its surrounding sectors, are recorded in the area for search processing. To be more specific, assuming that a LBA of the bad sector where an error occurs is 123456, and that a move of one line increments or decrements the LBA by 10000, contents recorded in the area for search processing are as shown in Table 2.

TABLE 1

| Sector as a center of a search | Surrounding sectors |
| --- | --- |
| LBA = 123456 | LBA = 113455, 113456, 113457, 123455, , 123457, 133455, 133456, 133457 |

As a search step 2, data is read from each of the surrounding sectors shown in Table 1. If the surrounding sector does not cause an error, a LBA of the sector is merely deleted. As for the sector that caused an error, the sector is recorded as a bad sector that becomes a center of the next search. In the case of FIG. 3, a sector having a LBA of 113456 and a sector having a LBA of 133456 are flawed. Accordingly, those sectors are identified as bad sectors, which are newly recorded in areas for search processing of the buffer 20. In this case, contents are recorded as shown in Table 2. Here, as described before, if the number of steps of ERP, which are executed during the reading of data, exceeds a predetermined specified value, or if even the execution of the ERP could not recover data of a sector, it is judged that an error occurred in the sector.

Next, data is read from each of the surrounding sectors shown in Table 2 in like manner, and the search step 2 is repeated thereafter. Then, if a bad sector is no longer found, the search step 2 ends.

The processing described above makes it possible to search for a bad sector.

TABLE 2

| Sector as a center of a search | Surrounding sectors |
| --- | --- |
| LBA = 113456 | LBA = 103455, 103456, 103457, 113455, , 113457, 123455, 123456, 123457 |
| LBA = 133456 | LBA = 123455, 123456, 123457, 133455, , 133457, 143455, 143456, 143457 |

Here, if "search interrupted/restart waited" is recorded as search history information corresponding to a sector that is a center of a search, information about a stage to which the search progresses is recorded, for the sector, as data about the search for the bad sector. For this reason, by use of the information, the search is restarted from the surrounding sector that has been interrupted in the last search. For example, according to information about surrounding sectors, search processing for which have already been completed, the search processing is performed for remaining sectors. In this case, the remaining sectors are determined by excluding the surrounding sectors, search processing for which have already been completed, from the surrounding sectors shown in Table 2. This makes it possible to utilize the result of search processing performed before without waste, and consequently the search for the bad sector can be performed with efficiency.

It is to be noted that for a sector where an error occurred, sector substitution processing is performed. To be more specific, data reading is not always impossible during data reading. However, if a large quantity of data must be modified because of an error correcting code, the HDD 1 rewrites the sector and reads it again. If an error correcting code further requires a modification of the data, the sector in hard disk 90 is considered to have a defect. A loss of data, therefore, is prevented by reassignment.

Moreover, in the case of an error that causes data not to be read out, the HDD 1 records a location of the sector. After that, when the sector is written, the HDD 1 reads the data again to check whether or not the data can be normally read. If the data cannot be read out again, the sector is considered to be unusable. Accordingly, a loss of data is minimized by reassignment.

Next, processing of a search for a bad sector as a second embodiment will be described. Also in this embodiment, the search step 1 and the search step 2 described above are performed. In this embodiment, the following processing is added.

In Table 2, LBA=123455, 123456, 123457, LBA=113455, 113457, and LBA=133455, 133457, which are surrounding sectors of two bad sectors (LBA=113456, 133456), are sectors, search processing for which is already completed as the surrounding sectors adjacent to the center sector of the last search. Such duplication always occurs because a bad sector as a center of a search continuously appears, along an extension of a flaw, adjacent to the bad sector as the center of the last search.

For this reason, as shown in FIG. 3, in the area for search processing of the buffer 20, a sector which is a center of the last search is also recorded as a history of sectors which are centers of searches.

TABLE 3

| Center of the last search | Sector as a center of a search | Surrounding sectors |
|---|---|---|
| LBA = 123456 | LBA = 113456 | LBA = 103455, 103456, 103457, 113455, , 113457, 123455, 123456, 123457 |
| LBA = 123456 | LBA = 133456 | LBA = 123455, 123456, 123457, 133455, , 133457, 143455, 143456, 143457 |

As a search step 3, as shown in FIG. 3, after mechanically selecting eight surrounding sectors adjacent to a sector as a center of the search, the sector as the center of the last search, and its surrounding sectors, are deleted from the eight sectors. Therefore, when a sector as a center of a search moves to one of adjacent sectors, it is possible to prevent the sector which was the center of the search just before the move, and its surrounding sectors, search processing of which has been performed, from being recorded as duplicated surrounding sectors, making it possible to perform search processing with efficiency. As a result, in the search step 3, contents in Table 4 shown below are recorded in the area for search processing of the buffer 20. It is to be noted that in FIG. 4, deleted sectors are indicated in thin color (also in the tables described below, deleted sectors are indicated in like manner).

Then, the search step 2 is performed for the surrounding sectors shown in Table 4, which makes it possible to search for a bad sector.

In this connection, if "search interrupted/restart waited" is recorded as search history information corresponding to the sector as a center of the search, as is the case with the above-mentioned example, the search is restarted, by use of the information, from the surrounding sector that has been interrupted in the last search.

TABLE 4

| Center of the last search | Sector as a center of a search | Surrounding sectors |
|---|---|---|
| LBA = 123456 | LBA = 113456 | LBA = 103455, 103456, 103457, 113455, , 113457, 123455, 123456, 123457 |
| LBA = 123456 | LBA = 133456 | LBA = 123455, 123456, 123457, 133455, , 133457, 143455, 143456, 143457 |

Next, processing of a search for a bad sector for a case where an error occurs in sectors on both sides of a flow, which is a third embodiment, will be described.

Figure 4:
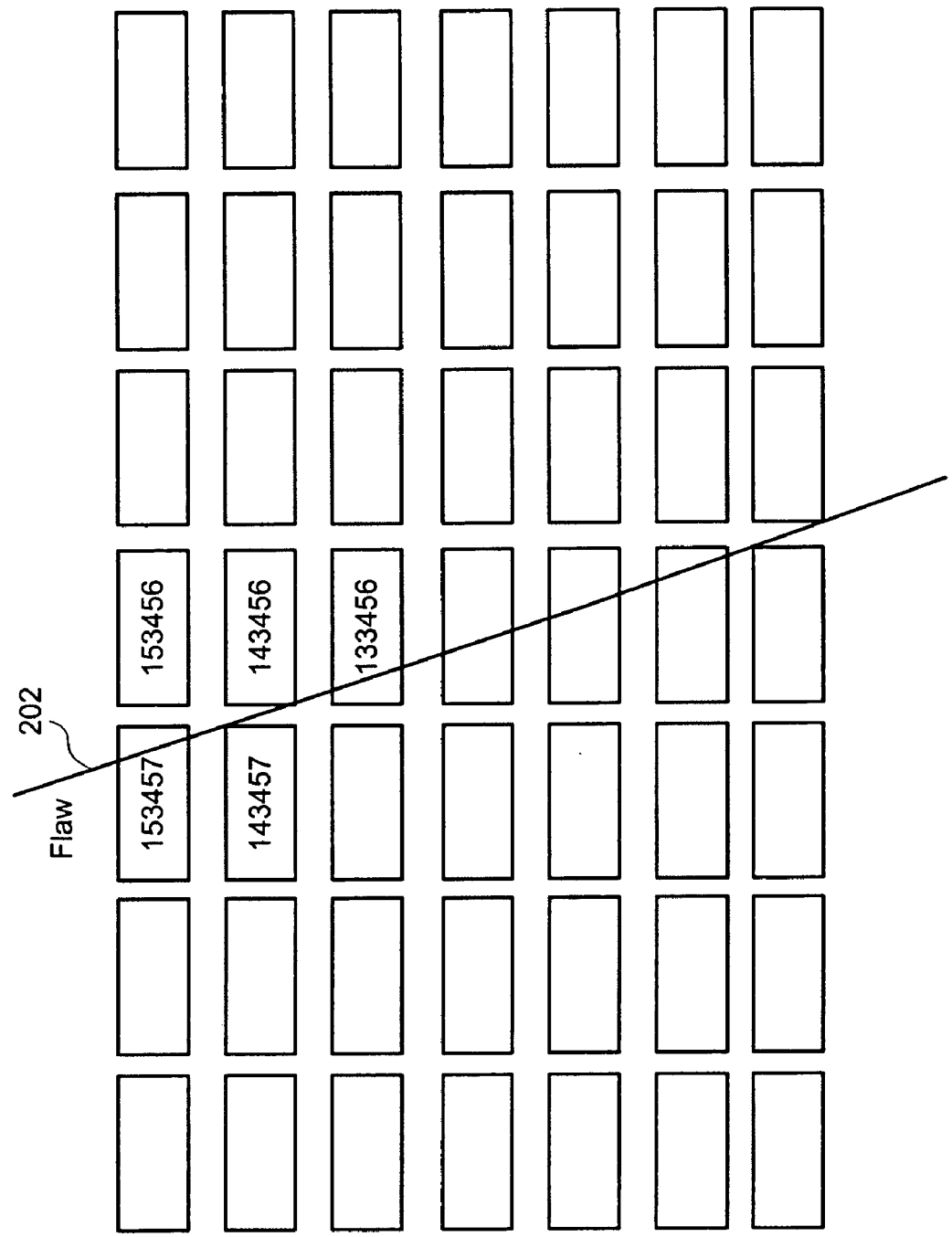
FIG. 4 is a diagram illustrating a state in which a flaw on the hard disk extends over two consecutive sectors.

FIG. 4 is a diagram illustrating a state in which a flaw on the hard disk 90 extends over two consecutive sectors. If the search steps 1 through 3 described above are executed one after another, an error may occur in sectors on both sides of a flaw, more specifically, in two sectors having consecutive LBAs, as shown in FIG. 4. For example, this is a case where a sector as a center of the last search is LBA=133456, and where sectors which are centers of searches currently performed are LBA=143457, 143456. In this case, contents in Table 5 are recorded in the area for search processing of the buffer 20.

TABLE 5

| Center of the last search | Sector as a center of a search | Surrounding sectors |
|---|---|---|
| LBA = 133456 | LBA = 143457 | LBA = 133456, 133457, 133458, 143456, , 143458, 153456, 153457, 153458 |
| LBA = 133456 | LBA = 143456 | LBA = 133455, 133456, 133457, 143455, , 143457, 153455, 153456, 153457 |

As executed by the above-mentioned search step 3, even if the sector as the center of the last search and its surrounding sectors are deleted from the surrounding sectors shown in Table 5, duplication occurs in some surrounding sectors (LBA=153456, 153457) as shown in Table 6 by underlining the LBAs.

TABLE 6

| Center of the last search | Sector as a center of a search | Surrounding sectors |
|---|---|---|
| LBA = 133456 | LBA = 143457 | LBA = 133456, 133457, 133458, 143456, , 143458, <u>153456</u>, <u>153457</u>, 153458 |
| LBA = 133456 | LBA = 143456 | LBA = 133455, 133456, 133457, 143455, , 143457, 153455, <u>153456</u>, <u>153457</u> |

In this case, as a search step 4, whether or not there is duplication of surrounding sectors between two central sectors for searches is judged by mutually comparing each surrounding sector of one central sector with each surrounding sector of the other central sector. If there is duplication, one of duplicated surrounding sectors is deleted. Table 7 illustrates surrounding sectors after the duplicated surrounding sectors (LBA=153456, 153457) shown in Table 6 are deleted. It should be noted that Table 7 illustrates an example in which duplicated sectors are deleted from the surrounding sectors of LBA=143457.

TABLE 7

| Center of the last search | Sector as a center of a search | Surrounding sectors |
|---|---|---|
| LBA = 133456 | LBA = 143457 | LBA = 133456, 133457, 133458, 143456, , 143458, 153456, 153457, 153458 |
| LBA = 133456 | LBA = 143456 | LBA = 133455, 133456, 133457, 143455, , 143457, 153455, <u>153456</u>, <u>153457</u> |

In this manner, if sectors as centers of searches have consecutive LBAs, and if sectors as centers of searches performed immediately before are the same, only the execution of the above-mentioned search step 3 cannot completely exclude duplicated surrounding sectors. Therefore, the execution of the search step 4 after having executed the search step 3 enables more efficient search processing.

It is to be noted that directly executing only the search step 4 without executing the search step 3 is also possible.

[Effects of the Invention] As described above, according to the present invention, searching for a bad sector beforehand makes it possible to prevent a loss of data before it happens.

What is claimed is:

1. A bad-sector search method, comprising:
   a bad sector recording step whereby when receiving a command that accesses a sector on a disk-shaped recording medium placed in a data recording device, a bad sector is detected, and then an address of the bad sector is recorded in a memory;
   a determining step for determining whether or not the data recording device is executing a command;
   a detecting step whereby if it is determined that the data recording device is not executing a command, addresses of surrounding sectors adjacent to the bad sector, the address of which is recorded in the memory, are recorded in the memory, and then whether or not each of the surrounding sectors is a bad sector is detected; and
   a bad-surrounding-sector recording step whereby if the surrounding sector is not a bad sector, the address of the surrounding sector is deleted from the memory, and if the surrounding sector is a bad sector, the address of the surrounding sector is recorded in the memory as a bad sector;
   if the number of steps of error recovery procedures executed for data recorded in the surrounding sector exceeds a predetermined specified value, the detecting step detects that the surrounding sector is a bad sector; and wherein said detecting step further comprises:
   processing that deletes an address of a sector, a search for which has already been completed, from the addresses of the surrounding sectors in the memory; and
   processing whereby focusing on the two bad sectors adjacent to each other, each address of surrounding sectors adjacent to one bad sector is mutually compared with each address of surrounding sectors adjacent to the other bad sector, and one of duplicated surrounding sectors is deleted from the memory.

2. A bad-sector search method according to claim 1, wherein:
   an interruption step for immediately interrupting the detecting step when the data recording device receives a command.

3. A bad-sector search method according to claim 1, further comprising:
   a step for recording history information about an interrupted search for a bad sector in the memory,
   wherein the detecting step is executed according to the history information recorded in the memory.

4. A method of searching for a bad sector among surrounding sectors in a data storage device, comprising:
   (a) initiating a search for a bad sector having an earliest recorded search history information of unsuccessful location of the bad sector among one or more bad sectors;
   (b) determining whether information is recorded as search history information about the bad sector to be searched for;
   (c) if no information is recorded as the search history information about the bad sector, initializing data about the search for the bad sector;
   (d) recording "search being executed" as the search history information corresponding to the bad sector to be searched for;
   (e) executing processing of the search for the bad sector;
   (f) recording "search completed" when the search is completed, and continuing with step (k);
   (g) recording "search completed";
   (h) checking whether there is a bad sector that should be searched for;
   (i) if there is a bad sector to be searched for, selecting the bad sector, and recording "search being executed" before proceeding to step (e);
   (j) if there is no bad sector to be searched for, ending the search;
   (k) receiving a command from a host computer while executing the search;
   (l) recording "search interrupted/restart waited" as the search history information corresponding to the bad sector that is being searched for;
   (m) interrupting the search; and further comprising:
   recording information about sectors surrounding the bad sector as data about the search for the bad sector after the surrounding sectors have been searched; and
   interrupting the search at any point when a command from the host so that the search may be performed without hindering the command from the host.

5. A method of searching for a bad sector among surrounding sectors in a data storage device, comprising:
   (a) initiating a search for a bad sector having an earliest recorded search history information of unsuccessful location of the bad sector among one or more bad sectors and locating a bad sector profiled as "search interrupted/restart waited" or "search not started";
   (b) determining whether information is recorded as search history information about the bad sector to be searched for;
   (c) if no information is recorded as the search history information about the bad sector, initializing data about the search for the bad sector;
   (d) recording "search being executed" as the search history information corresponding to the bad sector to be searched for;
   (e) executing processing of the search for the bad sector;
   (f) recording "search completed" when the search is completed, and continuing with step (k);
   (g) recording "search completed";
   (h) checking whether there is a bad sector that should be searched for;
   (i) if there is a bad sector to be searched for, selecting the bad sector, and recording "search being executed" before proceeding to step (e);
   (j) if there is no bad sector to be searched for, ending the search;
   (k) receiving a command from a host computer while executing the search;
   (l) recording "search interrupted/restart waited" as the search history information corresponding to the bad sector that is being searched for;
   (m) interrupting the search; and
   storing information about bad sectors in a ring buffer and, if there is no more free area in the ring buffer where the information is recorded, recorded information is deleted in the order the information was recorded, and then new information is overwritten at a location where the recorded information is deleted.

* * * * *